US006469078B1

(12) United States Patent
Simon et al.

(10) Patent No.: US 6,469,078 B1
(45) Date of Patent: Oct. 22, 2002

(54) MOLECULAR WEIGHT INCREASE AND MODIFICATION OF POLYCONDENSATES

(75) Inventors: Dirk Simon, Mutterstadt; Rudolf Pfaendner, Rimbach; Heinz Herbst, Lörrach, all of (DE)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/571,622

(22) Filed: May 15, 2000

(30) Foreign Application Priority Data

May 21, 1999 (CH) .................................................. 947/99

(51) Int. Cl.[7] .................................................. C08J 5/51
(52) U.S. Cl. ........................... 524/139; 521/48; 521/85; 521/88; 521/89; 521/90; 521/94; 524/195; 525/394; 525/420; 525/423; 525/424; 525/437; 525/438; 525/440; 525/463; 525/467; 528/287
(58) Field of Search ................................ 524/139, 195; 528/287; 525/438, 437, 440, 423, 424, 420, 394, 463, 467; 521/48, 85, 88, 89, 90, 94

(56) References Cited

U.S. PATENT DOCUMENTS

| | | | | |
|---|---|---|---|---|
| 3,376,258 A | * | 4/1968 | Gysling et al. .............. | 525/423 |
| 3,553,137 A | * | 1/1971 | Dijkstra et al. .............. | 525/437 |
| 3,875,145 A | * | 4/1975 | Law ........................... | 260/239 |
| 4,169,866 A | * | 10/1979 | Bonin et al. ................ | 525/440 |
| 4,600,752 A | * | 7/1986 | Meyer et al. ................ | 525/424 |
| 4,762,883 A | * | 8/1988 | Goel ........................... | 525/437 |
| 4,820,771 A | * | 4/1989 | Müssig et al. ............... | 525/430 |
| 4,933,429 A | * | 6/1990 | McCracken et al. ........ | 525/440 |
| 5,235,027 A | | 8/1993 | Thiele et al. ............... | 528/308.2 |
| 5,250,619 A | * | 10/1993 | Heinz et al. ................ | 525/425 |
| 5,288,764 A | * | 2/1994 | Rotter et al. ................. | 521/81 |
| 5,360,888 A | * | 11/1994 | Ulrich ........................ | 525/420 |
| 5,376,734 A | * | 12/1994 | Al Ghatta ................... | 525/437 |
| 5,436,056 A | * | 7/1995 | Takiyama et al. ........... | 525/437 |
| 5,496,920 A | * | 3/1996 | Pfaendner et al. .......... | 525/420 |
| 5,556,926 A | * | 9/1996 | Rotter et al. ................ | 525/437 |
| 5,654,347 A | * | 8/1997 | Khemani et al. ........... | 521/138 |
| 5,693,681 A | | 12/1997 | Pfaendner et al. ............ | 521/48 |
| 5,714,569 A | * | 2/1998 | Imaizumi et al. ........... | 528/272 |
| 5,747,606 A | * | 5/1998 | Pfaendner et al. .......... | 525/438 |
| 5,804,623 A | | 9/1998 | Hoffmann et al. .......... | 524/101 |
| 5,807,932 A | * | 9/1998 | Pfaendner et al. .......... | 525/437 |
| 5,885,709 A | * | 3/1999 | Wick et al. ................. | 525/437 |
| 6,028,129 A | * | 2/2000 | Pfaendner et al. .......... | 528/492 |
| 6,077,891 A | | 6/2000 | Herbst et al. ............... | 524/101 |

FOREIGN PATENT DOCUMENTS

| | | |
|---|---|---|
| DE | 4034459 | 5/1992 |
| WO | 98/33837 | 8/1998 |

OTHER PUBLICATIONS

R.–E. Grützner et al., Kunststoffe 82, (1992) pp. 284–288.
S. Fakirov et al., Kunststoffe 74, (1984), pp. 218–221.

* cited by examiner

Primary Examiner—Peter Szekely
(74) Attorney, Agent, or Firm—Tyler A. Stevenson; David R. Crichton

(57) ABSTRACT

This invention relates to a process for increasing the molecular weight and/or for the modification of polycondensates during the processing in the melt, which comprises adding to the polycondensate a blend comprising
  a) at least one polyfunctional anhydride (polyanhydride);
  b) at least one polyfunctional compound, the functional groups of which can react with the anhydride groups of component a); and
  c) at least one phosphonate.

This invention also relates to the use of an additive blend for increasing the molecular weight and for the modification of polycondensates during the processing in the melt.

14 Claims, No Drawings

MOLECULAR WEIGHT INCREASE AND MODIFICATION OF POLYCONDENSATES

The present invention relates to a process for increasing the molecular weight and for the modification of polycondensates, to the use of an additive blend effecting the increase in molecular weight as well as to the polycondensates obtainable by that process and to their use in particular as foam products.

Polycondensates, for example polyamides, polycarbonates or polyesters, in particular polyethylene terephthalate (PET) and polybutylene terephthalate (PBT) as well as polyester copolymers and polyester blends e.g. with polycarbonate (PBT/PC), are important thermoplastics belonging to the group of the engineering plastics. Partially crystalline polyesters are used for injection moulding compounds and are distinguished by high strength and rigidity, high dimensional stability and favourable wear characteristics. Amorphous polyesters have high transparency, superior toughness and excellent stress cracking resistance and are processed, for example, to hollow articles. Another field of application of PET is the production of fibres and foils.

The mechanical and physical properties depend essentially on the molecular weight of the polymer. Polycondensates are prepared by condensation in the melt. Average molecular weights can thus be obtained. For some applications, for example drinks packs and technical fibres, higher molecular weights are necessary. These can be obtained by solid phase polycondensation (S.Fakirov, Kunststoffe, 74 (1984), 218 and R. E. Grützner, A. Koine, Kunststoffe, 82 (1992), 284). The prepolymer is in this case subjected to thermal treatment above the glass transition temperature and below the melt temperature of the polymer under inert gas or under vacuum. However, this method is very time-and energy-consuming. Increasing the intrinsic viscosity requires a residence time of up to 12 hours under vacuum or under inert gas at temperatures from 180 to 240° C.

According to U.S. Pat. No. 5,235,027 pentaerythritol can also advantageously be added during the solid phase condensation.

WO 98/33837, on the other hand, discloses that the sole addition of pentaerythritol during the reactive extrusion adversely affects the intrinsic viscosity of PET.

Another possibility for obtaining higher molecular weights of polycondensates and, in particular, of polyesters is to add a tetracarboxylic anhydride and a sterically hindered hydroxy-phenylalkylphosphonate, as is disclosed in U.S. Pat. No. 5,693,681. However, a faster increase of the molecular weight at relatively low melt temperatures seems desirable for technical and economical reasons.

It has now been found that the addition of a combination of polyfunctional anhydride, polyfunctional alcohol or phenol and phosphonate with subsequent reactive extrusion of the mixture with a polycondensation polymer or copolymer makes it possible to substantially increase the molecular weight within short reaction times. Surprisingly, the addition of polyfunctional components does not produce any crosslinked polycondensates, but the polyfunctional compounds are essentially incorporated into the chain and result in chain lengthenings and/or branchings.

This is particularly advantageous in the case of used or thermally or hydrolytically damaged polycondensates where the damage typically goes hand in hand with a decrease of the molecular weight. The typical procedure for the processing of PET wastes described in DE 4034459 may be mentioned in comparison.

By means of the process of this invention it is possible to increase the molecular weight, in particular in the case of polycondensate recyclates from useful material collections, such as used packages (foils and bottles) and waste textiles. Recyclates can then be used for high-quality recycling, for example in the form of high-performance fibres, injection moulding articles, in extrusion applications or in the form of foams. Such recyclates originate, for example, also from industrial or domestic useful material collections, from production wastes, such as from fibre production and trimmings, or from obligatory returnables, such as bottle collections of PET drinks packs.

In addition, the physicochemical properties are altered through the process of this invention such that polycondensates can be foamed which normally cannot be easily foamed.

In comparison to unfoamed polymers, foamed polymers have, inter alia, the advantages of material saving, better heat insulation, lower density combined with better mechanical properties. Polymer foams are therefore used in many applications, for example packagings, heat insulation, buffers for the absorption of mechanical forces. Foams consisting of polycondensates meet with growing interest owing to their interesting mechanical properties, their continuous working temperature stability and moulding properties, which are superior to those of other foams.

In comparison to polymers, polycondensates are often characterised by low melt viscosities. At the same time, in particular in the case of polycondensates with aromatic units, there is a marked shear liquefaction during the processing of the polymer melt. This clear dependence of the melt viscosity on the shearing rate goes hand in hand with lower melt elasticities. A sufficiently high melt elasticity is, however, an important precondition for the foamability of polymers. In general, the production of foams from polycondensates is only possible after suitable structural modification.

It is known that, after polycondensation with monomers resulting in amorphous polycondensates, the foamability is improved, as is described, inter alia, in EP 560151. This is the case because the shear liquefaction in the polymer melt is reduced to a certain extent. Owing to aliphatic components, these foams have a lower hydrolytic stability and they are usually biodegradable, i.e. they are not suitable for outdoor use. Moreover, their thermostability is lower. These monomers are furthermore relatively expensive. Amorphous polycondensates are thus not absolutely desirable.

In one of its aspects, this invention relates to a process for increasing the molecular weight and/or for the modification of polycondensates during the processing in the melt, which process comprises adding to the polycondensate a blend comprising a) at least one polyfunctional anhydride (polyanhydride);

b) at least one polyfunctional compound, the functional groups of which can react with the anhydride groups of component a); and c) at least one phosphonate.

In addition to polyester, polyamide or polycarbonate, this invention also embraces the corresponding copolymers and blends, for example PBT/PS, PBT/ASA, PBT/ABS, PBT/PC, PET/ABS, PET/PC, PBT/PET/PC, PBT/PET, PA/PP, PA/PE and PA/ABS. However, it needs to be taken into account that the novel process, like all methods allowing exchange reactions between the components of the blend, may influence the blends, i.e. may result in the formation of copolymeric structures.

A preferred process is that wherein the polycondensate is an aliphatic or aromatic polyester, an aliphatic or aromatic polyamide or polycarbonate, or a blend or copolymer thereof.

The polycondensate is particularly preferably polyethylene terephthalate (PET), polybutylene therephthalate (PBT), polyethylenenaphthalate (PEN), polytrimethylene terephthalate (PTT), a copolyester, PA 6, PA 6.6, a polycarbonate containing bisphenol A, bisphenol Z or bisphenol F linked via carbonate groups.

Very particularly preferred polycondensates are PET or a copolymer with PET.

The polycondensate is preferably a recyclate.

Polyamides, i.e. both virgin polyamides and polyamide recyclates, are understood to be, for example, aliphatic and aromatic polyamides or copolyamides which are derived from diamines and dicarboxylic acids and/or of aminocarboxylic acid or the corresponding lactams. Suitable polyamides are for example: PA 6, PA 11, PA 12, PA 46, PA 66, PA 69, PA 610, PA 612, PA 10.12, PA 12.12 and also amorphous polyamides and thermoplastic polyamide elastomers such as polyether amides of the Vestamid, Grilamid ELY60, Pebax, Nyim and Grilon ELX type. Polyamides of the cited type are commonly known and are commercially available.

The polyamides used are preferably crystalline or partially crystalline polyamides and, in particular, PA6 and PA6.6 or their blends, as well as recyclates on this basis, or copolymers thereof.

The polyesters, i.e. virgin polyester as well as polyester recyclate, may be homopolyesters or copolyesters which are composed of aliphatic, cycloaliphatic or aromatic dicarboxylic acids and diols or hydroxycarboxylic acids.

The polyesters can be prepared by direct esterification (PTA process) and also by transesterification (DMT process). Any of the known catalyst systems may be used for the preparation.

The aliphatic dicarboxylic acids can contain 2 to 40 carbon atoms, the cycloaliphatic dicarboxylic acids 6 to 10 carbon atoms, the aromatic dicarboxylic acids 8 to 14 carbon atoms, the aliphatic hydroxycarboxylic acids 2 to 12 carbon atoms and the aromatic and cycloaliphatic hydroxycarboxylic acids 7 to 14 carbon atoms.

The aliphatic diols can contain 2 to 12 carbon atoms, the cycloaliphatic diol 5 to 8 carbon atoms and the aromatic diols 6 to 16 carbon atoms.

Polyoxyalkylene glycols having molecular weights from 150 to 40000 may also be used.

Aromatic diols are those in which two hydroxyl groups are bound to one or to different aromatic hydrocarbon radicals.

It is also possible that the polyesters are branched with small amounts, e.g. from 0.1 to 3 mol %, based on the dicarboxylic acids present, of more than difunctional monomers (e.g. pentaerythritol, trimellitic acid, 1,3,5-tri (hydroxyphenyl)benzene, 2,4-dihydroxybenzoic acid or 2-(4-hydroxyphenyl)-2-(2,4-dihydroxyphenyl)propane).

Suitable dicarboxylic acids are linear and branched saturated aliphatic dicarboxylic acids, aromatic dicarboxylic acids and cycloaliphatic dicarboxylic acids. Suitable aliphatic dicarboxylic acids are those containing 2 to 40 carbon atoms, for example oxalic acid, malonic acid, dimethylmalonic acid, succinic acid, pimelic acid, adipic acid, trimethyladipic acid, sebacic acid, azelaic acid and dimeric acids (dimerisation products of unsaturated aliphatic carboxylic acids such as oleic acid), alkylated malonic and succinic acids such as octadecylsuccinic acid.

Suitable cycloaliphatic dicarboxylic acids are: 1,3-cyclobutanedicarboxylic acid, 1,3-cyclopentanedicarboxylic acid, 1,3- and 1,4-cyclohexanedicarboxylic acid, 1,3- and 1,4-(dicarboxylmethyl)cyclohexane, 4,4'-dicyclohexyldicarboxylic acid.

Suitable aromatic dicarboxylic acids are: In particular terephthalic acid, isophthalic acid, o-phthalic acid, and 1,3-, 1,4-, 2,6- or 2,7-naphthalenedicarboxylic acid, 4,4'-diphenyidicarboxylic acid, 4,4'-diphenylsulfonedicarboxylic acid, 4,4'-benzophenonedicarboxylic acid, 1,1,3-trimethyl-5-carboxyl-3-(p-carboxylphenyl)indane, 4,4'-diphenyl ether dicarboxylic acid, bis-p-(carboxylphenyl)methane or bis-p-(carboxylphenyl)ethane.

The aromatic dicarboxylic acids are preferred, in particular terephthalic acid, isophthalic acid and 2,6-naphthalenedicarboxylic acid.

Other suitable dicarboxylic acids are those containing —CO—NH-groups; they are described in DE-A2414349. Dicarboxylic acids containing N-heterocyclic rings are also suitable, for example those which are derived from carboxylalkylated, carboxylphenylated or carboxybenzylated monoamine-s-triazinedicarboxylic acids (viz. DE-A-2121184 and 2533675), mono- or bishydantoins, optionally halogenated benzimidazoles or parabanic acid. The carboxyalkyl group can in this case contain 3 to 20 carbon atoms.

Suitable aliphatic diols are the linear and branched aliphatic glycols, in particular those containing 2 to 12, preferably 2 to 6, carbon atoms in the molecule, for example: ethylene glycol, 1,2- and 1,3-propylene glycol, 1,2-, 1,3-, 2,3- or 1,4-butanediol, pentyl glycol, neopentyl glycol, 1,6-hexanediol, 1,12-dodecanediol. A suitable cycloaliphatic diol is e.g. 1,4-dihydroxycyclohexane. Other suitable aliphatic diols are e.g. 1,4-bis(hydroxymethyl) cyclohexane, aromatic-aliphatic diols such as p-xylylene glycol or 2,5-dichloro-p-xylylene glycol, 2,2-(β-hydroxyethoxyphenyl)propane and also polyoxyalkylene glycols such as diethylene glycol, triethylene glycol, polyethylene glycol or polypropylene glycol. The alkylene diols are preferably linear and preferably contain 2 to 4 carbon atoms.

Preferred diols are the alkylenediols, 1,4-dihydroxycyclohexane and 1,4-bis(hydroxymethyl)-cyclohexane. Particularly preferred are ethylene glycol, 1,4-butanediol and 1,2- and 1,3-propylene glycol.

Other suitable aliphatic diols are the β-hydroxyalkylated, in particular β-hydroxyethylated, bisphenols such as 2,2-bis [4'-(β-hydroxyethoxy)phenyl]propane. Other bisphenols will be mentioned later.

Another group of suitable aliphatic diols are the heterocyclic diols described in DE-A-1812003, DE-A-2342432, DE-A-2342372 and DE-A-2453326, for example: N,N'-bis (β-hydroxyethyl)-5,5-dimethylhydantoin, N,N'-bis(β-hydroxypropyl)-5,5-dimethylhydantoin, methylenebis[N-(β-hydroxyethyl)-5-methyl-5-ethylhydantoin], methylenebis[N-(β-hydroxyethyl)-5,5-dimethylhydantoin], N,N'-bis(β-hydroxyethyl)benzimidazolone, N,N'-bis(β-hydroxyethyl)-(tetrachloro)benzimidazolone or N,N'-bis(β-hydroxyethyl)-(tetrabromo)benzimidazolone.

Suitable aromatic diols are mononuclear diphenols and, in particular dinuclear diphenols carrying a hydroxyl group at each aromatic nucleus. Aromatic will be taken to mean preferably hydrocarbonaromatic radicals, such as phenylene or naphthylene. Besides e.g. hydroquinone, resorcinol or 1,5-, 2,6- and 2,7-dihydroxynaphthalene, the bisphenols are to be mentioned in particular, which can be represented by the following formulae:

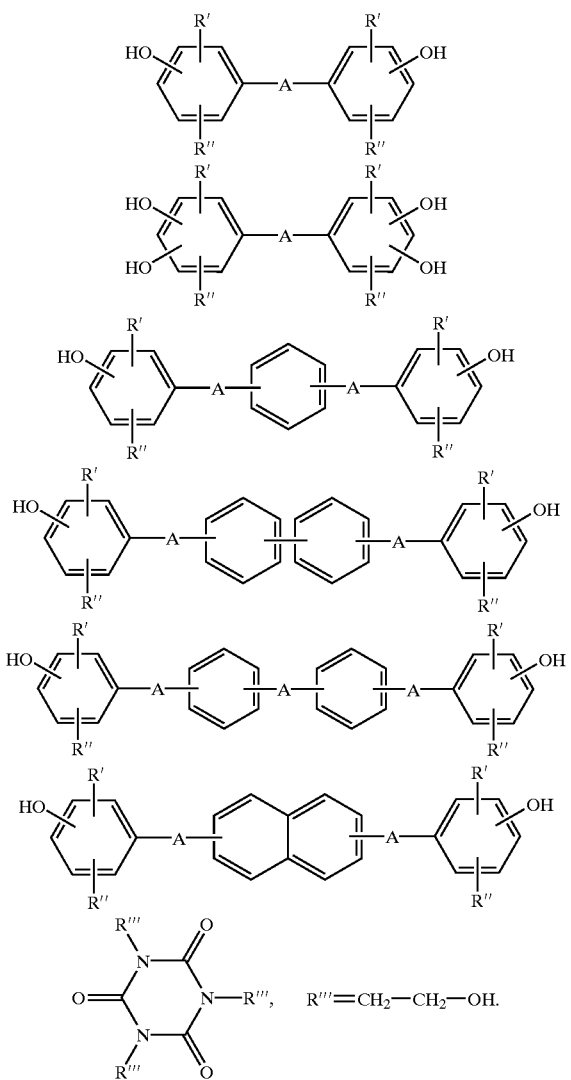

The hydroxyl groups can be in m-position, preferably in p-position, and R' and R" in these formulae can be alkyl containing 1 to 6 carbon atoms, halogen, such as chloro or bromo, and, in particular, hydrogen atoms. A may be a direct bond or —O—, —S—, —(O)S(O)—, —C(O)—, —P(O)($C_1$–$C_{20}$alkyl)-, unsubstituted or substituted alkylidene, cycloalkylidene or alkylene.

Examples of unsubstituted or substituted alkylidene are: ethylidene, 1,1- or 2,2-propylidene, 2,2-butylidene, 1,1-isobutylidene, pentylidene, hexylidene, heptylidene, octylidene, dichloroethylidene, trichloroethylidene.

Examples of unsubstituted or substituted alkylene are methylene, ethylene, phenylmethylene, diphenylmethylene, methylphenylmethylene. Examples of cycloalkylidene are cyclopentylidene, cyclohexylidene, cycloheptylidene and cyclooctylidene.

Examples of bisphenols are: bis(p-hydroxyphenyl) ether or bis(p-hydroxyphenyl) thioether, bis(p-hydroxyphenyl) sulfone, bis(p-hydroxyphenyl)methane, bis(4-hydroxyphenyl)-2,2'-biphenyl, phenylhydroquinone, 1,2-bis(p-hydroxyphenyl)ethane, 1-phenylbis(p-hydroxyphenyl)-ethane, diphenylbis(p-hydroxyphenyl)methane, diphenylbis(p-hydroxyphenyl)ethane, bis(3,5-dimethyl-4-hydroxyphenyl)sulfone, bis(3,5-dimethyl4-hydroxyphenyl)-p-diisopropylbenzene, bis(3,5-dimethyl-4-hydroxyphenyl)-m-diisopropylbenzene 2,2-bis(3',5'-dimethyl4'-hydroxyphenyl)propane, 1,1- or 2,2-bis(p-hydroxyphenyl)butane, 2,2-bis(p-hydroxyphenyl)hexafluoropropane, 1,1-dichloro- or 1,1,1-trichloro-2,2-bis(p-hydroxyphenyl)ethane, 1,1-bis(p-hydroxyphenyl)cyclopentane and, in particular, 2,2-bis(p-hydroxyphenyl)propane (bisphenol A) and 1,1-bis(p-hydroxyphenyl)cyclohexane (bisphenol C).

Suitable polyesters of hydroxycarboxylic acids are, for example, polycaprolactone, polypivalolactone or the polyesters of 4-hydroxycyclohexancarboxylic acid, 2-hydroxy-6-naphthalene carboxylic acid or 4-hydroxybenzoic acid.

Other suitable compounds are polymers which may predominantly contain ester bonds or also other bonds, for example polyester amides or polyester imides.

Polyesters containing aromatic dicarboxylic acids have become most important, in particular the polyalkylene terephthalates. Accordingly, those novel moulding compositions are preferred wherein the polyester consists to at least 30 mol %, preferably to at least 40 mol %, of aromatic dicarboxylic acids and to at least 30 mol %, preferably to at least 40 mol %, of alkylenediols containing preferably 2 to 12 carbon atoms, based on the polyester.

In this case the alkylenediol is, in particular, linear and contains 2 to 6 carbon atoms, for example ethylene glycol, tri-, tetra- or hexamethylene glycol and the aromatic dicarboxylic acid, terephthalic acid and/or isophthalic acid.

Particularly suitable polyesters are PET, PBT, PEN, PTT and corresponding copolymers, PET and its copolymer being especially preferred. The process is also particularly important in the case of PET recyclates originating, for example, from bottle collections such as collections of the beverages industry. These materials preferably consist of terephthalic acid, 2,6-naphthalenedicarboxylic acid and/or isophthalic acid in combination with ethylene glycol and/or 1,4-bis(hydroxymethyl)cyclohexane.

Polyester blends to be mentioned in particular are those comprising polycarbonate.

Polycarbonate (PC) is understood to mean both virgin polycarbonate and polycarbonate recyclate. PC is obtained, for example, from bisphenol A and phosgene or phosgene analog such as trichloromethylchloroformate, triphosgene or diphenylcarbonate, by condensation in the latter case usually with addition of a suitable transesterification catalyst, for example a boron hydride, an amine, such as 2-methylimidazole or a quaternary ammonium salt; in addition to bisphenol A other bisphenol components may also be used and it is also possible to use halogenated monomers in the benzene nucleus. Particularly suitable bisphenol components to be mentioned are: 2,2-bis(4'-hydroxyphenyl)propane (bisphenol A), 2,4'-dihydroxy-diphenylmethane, bis(4-hydroxyphenyl)methane, bis(4-hydroxyphenyl)methane, bis(4-hydroxy-5-propylphenyl)methane, 1,1-bis(4'-hydroxyphenyl)ethane, bis(4-hydroxyphenyl)-cyclohexylmethane, 2,2-bis(4'-hydroxyphenyl)-1-phenylpropane, 2,2-bis(3',5'-dimethyl-4'-hydroxyphenyl)propane, 2,2-bis(3',5'-dibromo4'-hydroxyphenyl)propane, 2,2-bis(3',5'-dichloro-4'-hydroxyphenyl)propane, 1,1-bis(4'-hydroxyphenyl)cyclododecane, 1,1-bis(3',5'-dimethyl-4'-hydroxyphenyl)cyclododecane, 1,1-bis(4'-hydroxyphenyl)-3,3,5-trimethylcyclohexane, 1,1-bis(4'-hydroxyphenyl)-3,3,5,5-tetramethylcyclohexane, 1,1-bis(4'-hydroxyphenyl)-3,3,5-trimethylcyclopentane and the bisphenols mentioned above. The polycarbonates may also be branched by suitable amounts of more than difunctional monomers (examples as indicated above for the polyesters).

The polyester copolymers or blends which may be used in the novel process are prepared in customary manner from the starting polymers. The polyester component is preferably PET, PBT, and the PC component is preferably a PC based on bisphenol A. The ratio of polyester to PC is preferably from 95:5 to 5:95, a particularly preferred ratio being that in which one component makes up at least 75%.

This invention is particularly important in the case of polyester recyclates, such as are recovered from production wastes, useful material collections or through so-called obligatory returnables e.g. from the automotive industry or from the electronics area. The polycondensate recyclates are in this case in many ways thermally and/or hydrolytically damaged. These recyclates may additionally also contain subordinate amounts of admixtures of plastics of different structure, for example polyolefins, polyurethanes, ABS or PVC. Furthermore, these recyclates may also contain admixtures owing to standard impurities, such as residues of colourants, adhesives, contact media or paints, traces of metal, water, operating agents, or inorganic salts.

The polyanhydride a) used is a polyanhydride which has 2–8 anhydride functions, it being possible for free carboxylic acid groups or carboxylates to be present besides the anhydride functions.

It is preferred to use tetracarboxylic dianhydrides.

Tetracarboxylic dianhydrides which may be used within the scope of this invention are those of formula

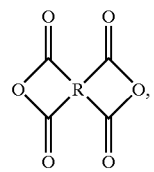

wherein R is $C_4$–$C_{20}$alkantetrayl or a radical of formulae (Xa)–(Xj)

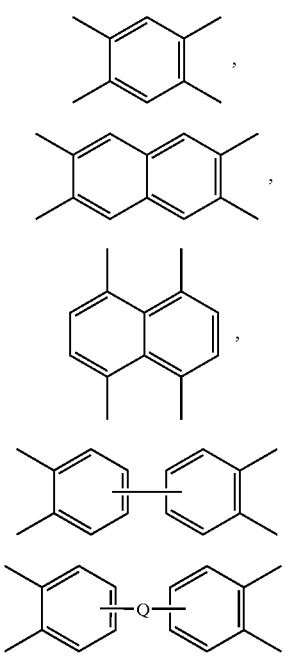

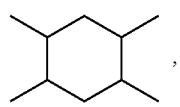 (Xf)

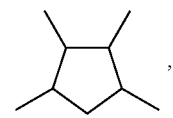 (Xg)

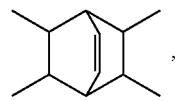 (Xh)

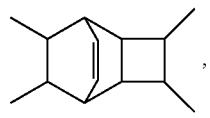 (Xi)

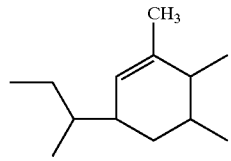 (Xj)

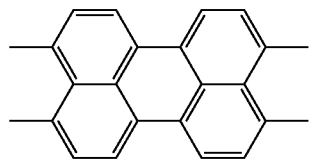 (Xk)

wherein Q is —$CH_2$—, —$CH(CH_3)$—, —$C(CH_3)_2$—, —$C(CF_3)_2$—, —S—, —O—, —$SO_2$—, —NHCO—, —CO— or >P(O)($C_1$–$C_{20}$alkyl) and wherein the aromatic rings in the formulae (Va)–(Ve) are unsubstituted or substituted by one or several $C_1$–$C_6$alkyl groups, $C_1$–$C_6$alkoxy groups or halogen atoms.

If R is an alkanetetrayl radical, then the tetracarboxylic dianhydride may be, for example, butane-1,2,3,4-tetracarboxylic dianhydride.

Preferred tetracarboxylic dianhydrides are those containing aromatic rings.

Particularly preferred are pyromellitic dianhydride, 3,3',4,4'-benzophenonetetracarboxylic dianhydride, 3,3',4,4'-biphenyltetracarboxylic dianhydride and oxydiphthalic dianhydride.

Where appropriate it is also possible to use a blend of tetracarboxylic dianhydrides of different structure.

Individual particularly preferred tetracarboxylic dianhydrides are: pyromellitic dianhydride, benzophenonetetracarboxylic dianhydride, 1,1,2,2-ethanetetracarboxylic dianhydride, 1,2,3,4-cyclopentanetetracarboxylic dianhydride, diphenylsulfonetetracarboxylic dianhydride, 5-(2,5-dioxotetrahydro-3-furanyl)-3-methyl-3 cyclohexane-1,2-dicarboxylic dianhydride, bis-(3,4-dicarbonacidphenyl) ether dianhydride, bis(3,4-dicarboxylic acid phenyl) thioether dianhydride, bisphenol A bisether dianhydride, 2,2-bis(3,4-dicarboxylic phenyl)hexafluoropropane dianhydride, 2,3,6,7-naphthalenetetracarboxylic dianhydride, bis(3,4-dicarboxylic acid phenyl)sulfone dianhydride, 1,2,5,6-naphthalenetetracarboxylic dianhydride, 2,2',3,3'-biphenyl-tetracarboxylic dianhydride, hydroquinone bisether dianhydride, 3,4,9,10-perylenetetracarboxylic dianhydride, 1,2,3,4- cyclobutanetetracarboxylic dianhydride, 3,4-dicarboxy-1,2,3,4-tetrahydro-1-naphthalenesuccinic dianhydride, bicyclo(2,2)oct-7-ene-2,3,5,6-tetracarboxylic dianhydride, tetrahydrofuran-2,3,4,5-tetracarboxylic dianhydride, 2,2-bis(3,4-dicarboxyphe-nyl)propane dianhydride, 3,3',4,4'-biphenyltetracarboxylic dianhydride, 4,4'-oxydiphthalic dianhydride (ODPA), ethylenediaminetetracarboxylic dianhydride (DDTAH), or a combination of these dianhydrides.

The polyfunctional compound b) is a polyfunctional hydroxyl compound (polyol), a polyfunctional epoxy compound, a polyfunctional amine compound (polyamine), a polyfunctional aziridine compound (polyaziridine), a polyfunctional isocyanate compound (polyisocyanate), a polyfunctional oxazoline compound (polyoxazoline), a polyfunctional thioalcohol, or a combination of these compounds.

It is preferred to use a polyol consisting of phenols and/or alcohols containing 3–10 free hydroxyl groups, a polythiol consisting of thiophenols and/or thioalcohols containing 3–10 free thiol groups, an aromatic and/or aliphatic polyamine containing 3–10 free amino groups, a polyoxazoline, a polyaziridine or an epoxy compound containing at least two epoxy groups.

Polyfunctional, in particular difunctional, compounds from the class of the epoxides in the sense of this invention may have an aliphatic, aromatic, cycloaliphatic, araliphatic or heterocyclic structure; they contain epoxy groups as side groups or these groups form part of an alicyclic or heterocyclic ring system. The epoxy groups are preferably bound as glycidyl groups via ether or ester bonds to the remaining molecule, or they are N-glycidyl derivatives of heterocyclic amines, amides or imides. Epoxides of this type are commonly known and are commercially available.

The epoxides contain, for example, two epoxy radicals, for example those of formula IV

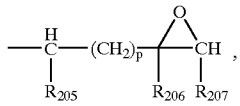

(IV)

which radicals are directly bound to carbon, oxygen, nitrogen or sulfur atoms, wherein, if $R_{205}$ and $R_{207}$ are hydrogen, $R_{206}$ is hydrogen or methyl and p=0; or, if $R_5$ and $R_7$ together are —$CH_2$—$CH_2$— or —$CH_2$—$CH_2$—$CH_2$—, $R_6$ is hydrogen and p=0 or 1.

Examples of epoxides to be mentioned are:

1. Diglycidyl ester and di(β-methylglycidyl)ester obtainable by reacting a compound containing two carboxyl groups in the molecule with epichlorohydrin or glycerol dichlorohydrin or β-methylepichlorohydrin. The reaction is usefully carried out in the presence of bases.

Compounds containing two carboxyl groups in the molecule may be aliphatic dicarboxylic acids. Examples of these dicarboxylic acids are glutaric acid, adipic acid, pimelic acid, suberic acid, azelaic acid, sebacic acid or dimerised or trimerised linolic acid.

However, it is also possible to use cycloaliphatic dicarboxylic acids, such as tetrahydrophthalic acid, 4-methyltetrahydrophthalic acid, hexahydrophthalic acid or 4-methylhexahydrophthalic acid.

Aromatic dicarboxylic acids may also be used, such as phthalic acid or isophthalic acid.

2. Diglycidyl ether or di(β-methylglycidyl)ether obtainable by reacting a compound containing two free alcoholic hydroxyl groups and/or phenolic hydroxyl groups with a suitably substituted epichlorohydrin under alkaline conditions or in the presence of an acid catalyst with subsequent treatment with alkali.

Ethers of this type are derived, for example, from acyclic alcohols, such as ethylene glycol, diethylene glycol and higher poly(oxyethylene)glycols, propane-1,2-diol, or poly(oxypropylene)glycols, propane-1,3-diol, butane-1,4-diol, poly(oxytetramethylene)glycols, pentane-1,5-diol, hexane-1,6-diol, sorbitol, and from polyepichlorohydrins.

They are also derived, for example, from cycloaliphatic alcohols such as 1,3- or 1,4-dihydroxycyclohexane, bis(4-hydroxycyclohexyl)methane, 2,2-bis(4-hydroxycyclohexyl)propane or 1,1-bis(hydroxymethyl)-cyclohex-3-ene, or they have aromatic nuclei such as N,N-bis(2-hydroxyethyl)aniline or p,p'-bis(2-hydroxyethylamino)diphenylmethane.

The epoxides can also be derived from mononuclear phenols, for example from resorcinol, pyrocatechol or hydroquinone; or they are based on polynuclear phenols such as on 4,4'-dihydroxybiphenyl, bis(4-hydroxyphenyl)methane, 2,2-bis(4-hydroxyphenyl)propane, 2,2-bis-(3,5-dibromo-4-hydroxyphenyl)propane, 4,4'-dihydroxydiphenylsulfone, 9,9'-bis(4-hydroxy-phenyl)fluorene, or on condensates, obtained under acid conditions, of phenols with formaldehyde such as phenol novolaks.

3. Di(N-glycidyl) compounds are obtainable, for example, by dehydrochlorination of the reaction products of epichlorhydrin with amines containing two aminohydrogen atoms. These amines are, for example, aniline, toluidine, n-butylamine, bis(4-aminophenyl)methane, m-xylylenediamine or bis(4-methylaminophenyl)methane.

The di(N-glycidyl) compounds also include N,N'-diglycidyl derivatives of cycloalkylene ureas, such as ethylene urea or 1,3-propylene urea, and N,N'-diglycidyl derivatives of hydantoins, such as of 5,5-dimethylhydantoin.

4. Di(S-glycidyl) compounds, such as di-S-glycidyl derivatives, which are derived from dithiols, such as ethane-1,2-dithiol or bis(4-mercaptomethylphenyl) ether.

5. Epoxides containing a radical of formula IV, wherein $R_{205}$ and $R_{207}$ together are —$CH_2$—$CH_2$— and n is 0, for example bis(2,3-epoxycyclopentyl) ether, 2,3-epoxycyclopentyl glycidyl ether or 1,2-bis(2,3-epoxycyclopentyloxy)ethane; epoxides containing a radical of formula IV, wherein $R_5$ and $R_7$ together are —$CH_2$—$CH_2$— and n is 1, for example 3,4-epoxy-6-methylcyclohexanecarboxylic acid-(3',4'-epoxy-6'-methylcyclohexyl)methyl ester.

Due to e.g. the process for their preparation, the difunctional epoxides mentioned above can contain minor amounts of mono- or trifunctional components.

Diglycidyl compounds having aromatic structures are mainly used.

Where appropriate, it is also possible to use a blend of epoxides of different structure.

On the other hand it is also possible to use tri- and polyfunctional epoxides as supplement in order to obtain branchings, if desired. Such epoxides are, for example, a) liquid diglycidyl ethers of bisphenol A such as Araldit®GY 240, Araldit®GY 250, Araldit®GY 260, Araldit° GY 266, Araldit GY 2600, Araldit®MY 790; b) solid diglycidyl ethers of bisphenol A such as Araldit®GT 6071, Araldit®GT 7071, Araldit®GT 7072, Araldit®GT 6063, Araldit®GT 7203, Araldit®GT 6064, Araldit®GT 7304, Araldit®GT 7004, Araldit®GT 6084, Araldit®GT 1999, Araldit®GT 7077, Araldit GT 6097, Araldit®GT 7097, Araldit®GT 7008, Araldit®GT 6099, Araldit®GT 6608, Araldit®GT 6609, Araldit®GT 6610; c) liquid diglycidyl ethers of bisphenol F such as Araldit®GY 281, Araldit®GY282, Araldit®PY 302, Araldit®PY 306; d) solid polyglycidyl ethers of tetraphenylethane such as CG Epoxy resin®0163; e) solid and liquid polyglycidyl ethers of phenolformaldehyde novolak such as EPN 1138, EPN 1139, GY 1180, PY 307; f) solid and liquid polyglycidyl ethers of o-cresolformaldehyde novolak such as ECN 1235, ECN 1273, ECN 1280, ECN 1299; g) liquid glycidyl ethers of alcohols such as Shell® glycidyl ether 162, Araldit®DY 0390, Araldit®DY 0391; h) liquid glycidyl esters of carboxylic acids such as Shell®Cardura E terephthalate, trimellitate, Araldit®PY 284 or mixtures of aromatic glycidyl esters such as Araldit®PT 910; i) solid heterocyclic epoxy resins (triglycidyl isocyanurate) such as Araldit®PT 810; j) liquid cycloaliphatic epoxy resins such as Araldit®CY 179; k) liquid N,N,O-triglycidyl ethers of p-aminophenol such as Araldit®MY 0510; l) tetraglycidyl4-4'-methylenebenzamine or N,N,N',N'-tetraglycidyldiaminophenylmethane such as Araldit®MY 720, Araldit®MY 721.

Particularly preferred difunctional epoxides are diglycidyl ethers based on bisphenols, for example based on 2,2-bis(4-hydroxyphenyl)propane (bisphenol A), bis(4-hydroxyphenyl)-sulfone (bisphenol S), mixtures of bis(ortholpara-hydroxyphenyl)methane (bisphenol F) or Araldit®MT 0163.

Solid epoxies of the diglycidyl ether of bisphenol A type are very particularly preferred, e.g.: Araldit®GT 6071, GT 7071, GT 7072, GT 6097 and GT 6099 or liquid epoxides of the bisphenol F type such as Araldit®GY 281 or PY 306.

Preferably 0.01–5 parts, more preferably 0.02 to 2 parts, most preferably 0.05 to 1 part, of a diepoxide are used, based on 100 parts of polycondensate.

Polyfunctional, in particular trifunctional, compounds from the class of the oxazolines in the sense of this invention are known and are described, inter alia, in EP-A-0583807 and are, for example, compounds of formula V

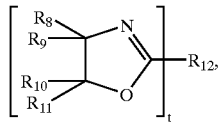

wherein $R_8$, $R_9$, $R_{10}$ and $R_{11}$ are each independently of one another hydrogen, halogen, $C_1$–$C_{20}$alkyl, $C_4$–$C_{15}$cycloalkyl, unsubstituted or $C_1$–$C_4$alkyl-substituted phenyl; $C_1$–$C_{20}$alkoxy or $C_2$–$C_{20}$carboxyalkyl, if t=3, $R_{12}$ is a trivalent linear, branched or cyclic aliphatic radical containing 1 to 18 carbon atoms which may be interrupted by oxygen, sulfur or

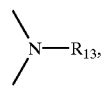

or $R_{12}$ is also an unsubstituted or $C_1$–$C_4$alkyl-substituted benzenetriyl, if t=2, $R_{12}$ is a divalent linear, branched or cyclic aliphatic radical containing 1 to 18 carbon atoms which may be interrupted by oxygen, sulfur or

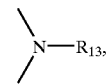

or $R_{12}$ is also an unsubstituted or $C_1$–$C_4$alkyl-substituted phenylene, $R_{13}$ is $C_1$–alkyl, and t is 2 or 3.

Halogen is, for example, fluoro, chloro, bromo or iodo. Chloro is particularly preferred.

Alkyl containing up to 20 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octa-decyl, eicosyl or docosyl. A preferred meaning of $R_8$, $R_9$, $R_{10}$ and $R_{11}$ is $C_1$–$C_{12}$alkyl, in particular $C_1$–$C_8$alkyl, e.g. $C_1$–$C_4$alkyl. $C_4$–$C_{15}$Cycloalkyl, in particular $C_5$–$C_{12}$cycloalkyl, is e.g. cyclobutyl, cyclopentyl, cyclohexyl, cycloheptyl, cyclooctyl or cyclododecyl. $C_5$–$C_8$Cycloalkyl is preferred, in particular cyclohexyl.

$C_1$–$C_4$Alkyl-substituted phenyl which preferably contains 1 to 3, more preferably 1 or 2, alkyl groups is, for example, o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl or 2,6-diethylphenyl.

Alkoxy containing up to 20 carbon atoms is a branched or unbranched radical, for example methoxy, ethoxy, propoxy, isopropoxy, n-butoxy, isobutoxy, pentoxy, isopentoxy, hexoxy, heptoxy, octoxy, decyloxy, tetradecyloxy, hexadecyloxy or octadecyloxy. A preferred meaning of $R_8$, $R_9$, $R_{10}$ and $R_{11}$ is alkoxy containing 1 to 12, preferably 1 to 8, e.g. 1 to 4, carbon atoms.

Carboxyalkyl containing 2 up to 20 carbon atoms is a branched or unbranched radical, for example carboxymethyl, carboxyethyl, carboxypropyl, carboxybutyl, carboxypentyl, carboxyhexyl, carboxyheptyl, carboxyoctyl, carboxynonyl, carboxydecyl, carboxyundecyl, carboxydodecyl, 2-carboxy-1-propyl, 2-carboxy-1-butyl or 2-carboxy-1-pentyl. A preferred meaning of $R_8$, $R_9$, $R_{10}$ and $R_{11}$, is $C_2$–$C_{12}$carboxyalkyl, in particular $C_2$–$C_8$carboxyalkyl, e.g. $C_2$–$C_4$carboxyalkyl.

A trivalent linear, branched or cyclic aliphatic radical containing 1 to 18 carbon atoms, which radical may be interrupted by oxygen, sulfur or

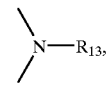

means that the three bonding sites may be at the same atom or at different atoms. Examples thereof are methanetriyl, 1,1,1-ethanetriyl, 1,1,1-propanetriyl, 1,1,1-butanetriyl, 1,1,1-pentanetriyl, 1,1,1-hexanetriyl, 1,1,1-heptanetriyl, 1,1,1-octanetriyl, 1,1,1-nonanetriyl, 1,1,1-decanetriyl, 1,1,1-undecanetriyl, 1,1,1-dodecanetriyl, 1,2,3-propanetriyl, 1,2,3-butanetriyl, 1,2,3-pentanetriyl, 1,2,3-hexanetriyl, 1,1,3-cyclopentanetriyl, 1,3,5-cyclohexanetriyl, 3-oxo-1,1,5-pentanetriyl, 3-thio-1,1,5-pentanetriyl or 3-methylamino-1,1,5-pentanetriyl.

A divalent linear, branched or cyclic aliphatic radical containing 1 to 18 carbon atoms, which radical may be interrupted by oxygen, sulfur or

means that the two bonding sites may be at the same atom or at different atoms. Examples thereof are methylene, ethylene, propylene, butylene, pentylene, hexylene, heptylene, octylene, nonylene, decylene, undecylene or dodecylene.

Unsubstituted or $C_1$–$C_4$alkyl-substituted benzenetriyl which preferably contains 1 to 3, more preferably 1 or 2, alkyl groups is, for example, 1,2,4-benzenetriyl, 1,3,5-benzenetriyl, 3-methyl-1,2,4-benzoltriyl or 2-methyl-1,3,5-benzenetriyl. 1,2,4-Benzenetriyl and 1,3,5-benzenetriyl are particularly preferred.

Particularly interesting compounds are those of formula V, wherein $R_8$, $R_9$, $R_{10}$ and $R_{11}$ are each independently of one another hydrogen or $C_1$–$C_4$alkyl, and $R_{12}$ is 1,2,4-benzenetriyl or 1,3,5-benzenetriyl.

Especially interesting are compounds of formula V, such as 2,2',2''-(1,3,5-benzoltriyl)-tris-2-oxazoline; 2,2',2''-(1,2,4-benzoltriyl)-tris-4,4-dimethyl-2-oxazoline; 2,2',2''-(1,3,5-benzoltriyl)-tris-4,4-dimethyl-2-oxazoline; 2,2',2''-(1,2,4-benzoltriyl)-tris-5-methyl-2-oxazoline; or 2,2',2''-(1,3,5-benzoltriyl)-tris-5-methyl-2-oxazoline.

Preferred difunctional compounds from the class of the bisoxazolines in the sense of this invention are described by T. Loontjens et al., Makromol. Chem., Macromol. Symp. 75, 211–216 (1993) and are, for example, compounds of formulae

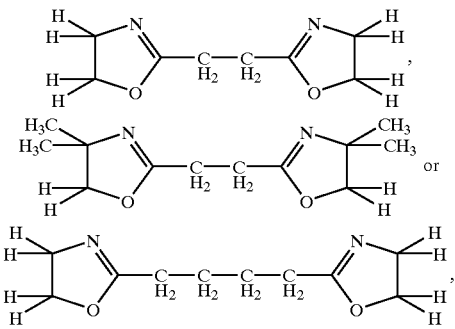

Polyfunctional, in particular difunctional, compounds from the class of the isocyanates in the sense of this invention are known and are, for example, compounds of formula VII

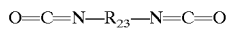

(VII), wherein $R_{23}$ is $C_1$–$_{20}$alkylene or polymethylene, arylene, aralkylene or cycloalkylene. Preferred diisocyanates are tetramethylenediisocyanate, hexamethylenediisocyanate, dodecamethylenediisocyanate, eicosan-1,20-diisocyanate, 4-butylhexamethylenediisocyanate, 2,2,4- or 2,4,4-trimethylhexamethylenediisocyanate, OCN(CH$_2$)$_2$O(CH$_2$)$_2$NCO, toluene-2,4-diisocyanate, p-phenylenediisocyanate, xylylenediisocyanate, 3-isocyanatomethyl-3,5,5-trimethylcyclohexylisocyanate, naphthalenediisocyanate, sulfonyldiisocyanate, 3,3'-, 4,4'- and 3,4'-diisocyanates of diphenylmethane, 2,2-diphenylpropane and diphenyl ether, 3,3'-dimethyl-4,4'-diisocyanatodiphenyl, 3,3'-dimethoxy-4,4'-diisocyanatodiphenyl and 4,4'-diisocyanatodiphenylmethane.

The diisocyanates listed above are commercially available or can be prepared from commercially available amines.

It is also possible to use diisocyanate generators, such as polymeric urethanes, uretdion dimers and higher oligomers, cyanurate polymers, urethanes and polymeric urethanes of cyanurate polymers and thermally dissociable adducts of Schiff's bases.

Polyfunctional compounds from the class of the alcohols in the sense of this invention are known and are, for example, pentaerythritol, dipentaerythritol, tripentaerythritol, bistrimethylolpropane, bistrimethylolethane, trismethylolpropane, sorbitol, maltite, isomaltite, lactite, lycasine, mannitol, lactose, leucrose, tris(hydroxyethyl)isocyanurate, palatinite, tetramethylolcyclohexanol, tetramethylolcyclopentanol, tetramethylolcyclopyranol, glycerol, diglycerol, polyglycerol or 1-0-α-D-glycopyranosyl-D-mannitoldihydrate, 1,1,1-tris(4-hydroxyphenyl)-ethane, 4,6-dimethyl-2,4,6-tris(4-hydroxyphenyl)heptane, 2,2-bis(4-(4-hydroxyphenyl)cyclohexyl)propane, 1,3,5trihydroxybenzene, 1,2,3-trihydroxybenzene, 1,4-bis(4-hydroxyphenyl) -phenyl)benzene, 2,3,4-trihydroxyacetophenone, 2,3,4-trihydroxybenzoic acid, 2,3,4-trihydroxybenzophenone, 2,4,4'-trihydroxybenzophenone, 2',4',6'-trihydroxy-3-(4-hydroxyphenyl)propiophenone, pentahydroxyflavone, 3,4,5-trihydroxypyrimidine, 3,4,5-trihydroxyphenylmethylamine, tetrahydroxy-1,4-quinonehydrate, 2,2',4,4'tetrahydroxybenzophenone or 1,2,5,8-tetrahydroxyanthraquinone. Pentaerythritol, dipentaerythritol and tris(hydroxyethyl)-isocyanurate are preferred.

Preferably, the polyol is glycerol or pentaerythritol; the epoxy compound is aminophenol triglycidyl ether, trimellitic acid triglycidyl ester or Araldit MT 0163; the oxazoline is 2,2'-bis-(4H-3,1-benzoxazin-4-one), the polyamine is 2-aminomalonamine, 1,2,3-triaminopropane, triaminobenzene, triaminotoluene, triaminoanisole, triaminonaphthalene, triaminopyridine, triaminopyrimidine, tetraaminopyrimidine, tetraaminobenzene, tetraaminodiphenyl, tetra-aminodiphenylsulfone, hexaaminodiphenyl, triamincyclopropane; the polyaziridine is tris[1-(2-methyl)aziridinyl]phosphine oxide, and the polythiol is 1,2,3-trimercaptopropane, trimercaptobenzene or trimercaptoaniline.

Phosphonates of formula I

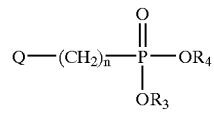

(I)

are preferred, wherein $R_3$ is H, $C_1$–$C_{20}$alkyl, unsubstituted or $C_1$–$C_4$alkyl-substituted phenyl or naphthyl, $R_4$ is hydrogen, $C_1$–$C_{20}$alkyl, unsubstituted or $C_1$–$C_4$alkyl-substituted phenyl or naphthyl; or $M^{r+}/r$, $M^{r+}$ is an r-valent metal cation or the ammonium ion, n is 0,1, 2, 3, 4, 5 or 6, and r is 1, 2, 3 or 4;

Q is hydrogen, —X—C(O)—OR₇, or a radical

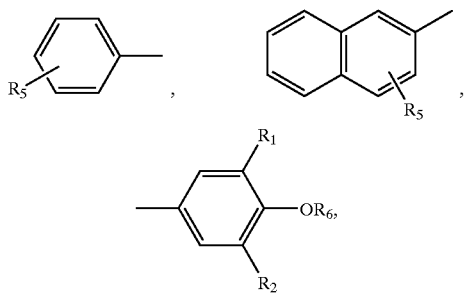

R₁ is isopropyl, tert-butyl, cyclohexyl, or cyclohexyl which is substituted by 1–3 C₁–C₄alkyl groups, R₂ is hydrogen, C₁–C₄alkyl, cyclohexyl, or cyclohexyl which is substituted by 1–3 C₁₋₄alkyl groups, R₅ is H, C₁–C₁₈alkyl, OH, halogen or C₃–C₇cycloalkyl;

R₆ is H, methyl, trimethylsilyl, benzyl, phenyl, sulfonyl or C₁–C₁₈alkyl;

R₇ is H, C₁–C₁₀alkyl or C₃–C₇cycloalkyl; and

X is phenylene, C₁–C₄alkyl group-substituted phenylene or cyclohexylene.

Other suitable phosphonates are listed below.

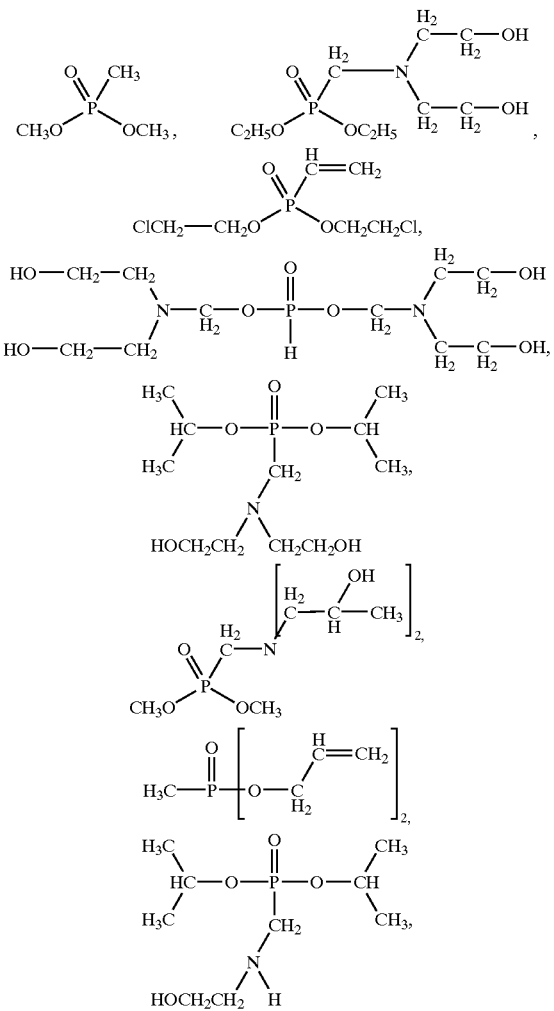

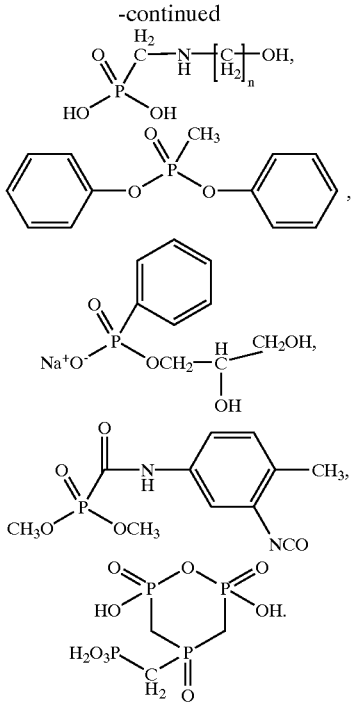

Sterically hindered hydroxyphenylalkylphosphonic acid esters or half-esters, such as those known from U.S. Pat. No. 4,778,840, are preferred.

Particularly preferred compounds are those of formula Ia

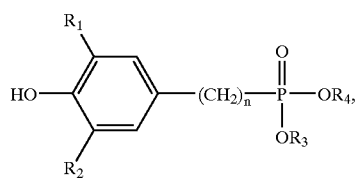

(Ia)

R₁ is H, isopropyl, tert-butyl, cyclohexyl, or cyclohexyl which is substituted by 1–3 C₁–C₄alkyl groups, R₂ is hydrogen, C₁–C₄alkyl, cyclohexyl, or cyclohexyl which is substituted by 1–3C₁₋₄alkyl groups, R₃ is C₁–C₂₀alkyl, unsubstituted or C₁–C₄alkyl-substituted phenyl or naphthyl, R₄ is hydrogen, C₁–C₂₀alkyl, unsubstituted or C₁–C₄alkyl-substituted phenyl or naphthyl; or M^{r+}/r M^{r+} is an r-valent metal cation, n is 1, 2, 3, 4, 5 or 6, and r is 1, 2, 3 or 4.

Halogen is fluoro, chloro, bromo or iodo.

Alkyl substituents containing up to 18 carbon atoms are suitably radicals such as methyl, ethyl, propyl, butyl, pentyl, hexyl and octyl, stearyl and also corresponding branched isomers; C₂–C₄alkyl and isooctyl are preferred.

C₁–C₄Alkyl-substituted phenyl or naphthyl which preferably contain 1 to 3, more preferably 1 or 2, alkyl groups is e.g. o-, m- or p-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-methyl-6-ethylphenyl, 4-tert-butylphenyl, 2-ethylphenyl, 2,6-diethylphenyl, 1-methylnaphthyl, 2-methylnaphthyl, 4-methylnaphthyl, 1,6-dimethylnaphthyl or 4-tert-butyinaphthyl.

$C_1$–$C_4$Alkyl-substituted cyclohexyl which preferably contains 1 to 3, more preferably 1 or 2, branched or unbranched alkyl group radicals, is e.g. cyclopentyl, methylcyclopentyl, dimethylcyclopentyl, cyclohexyl, methylcyclohexyl, dimethylcyclohexyl, trimethylcyclohexyl or tertbutylcyclohexyl.

A mono-, di-, tri- or tetra-valent metal cation is preferably an alkali metal, alkaline earth metal heavy metal or aluminum cation, for example $Na^+$, $K^+$, $Mg^{++}$, $Ca^{++}$, $Ba^{++}$, $Zn^{++}$, $Al^{++}$, or $Ti^{++++}$. $Ca^{++}$ is particularly preferred.

Preferred compounds of formula I are those containing at least one tert-butyl group as $R_1$ or $R_2$. Very particularly preferred compounds are those, wherein $R_1$ and $R_2$ are at the same time tert-butyl.

n is preferably 1 or 2 and, very particularly preferably, 1.

Very particularly preferred sterically hindered arylalkylphosphonic acid esters or half-esters are the compounds of formula II, III, IV, V and VI

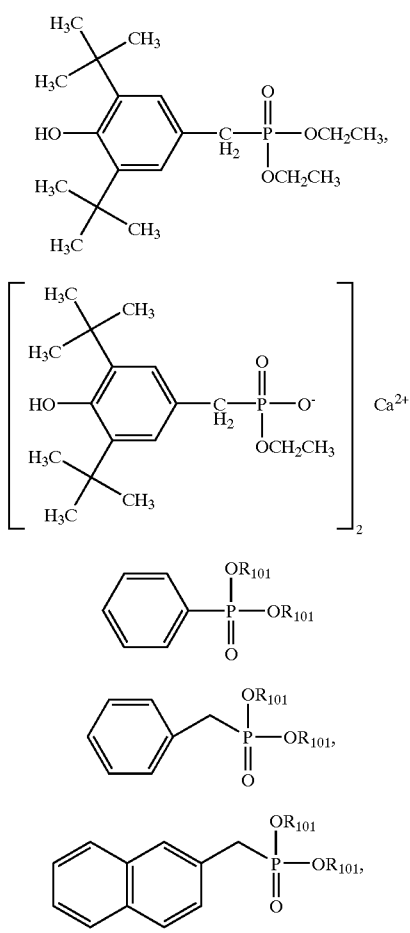

wherein the $R_{101}$ are each independently of one another hydrogen, ethyl, phenyl or $M^{r+}/r$. Meanings of $M^{r+}/r$ have been cited above.

Some of the compounds I, III, IV, V and VI are commercially available or can be prepared by standard processes.

The process can be carried out in any heatable vessel fitted with a stirring device. It is preferred to carry out heating in closed apparatus with exclusion of atmospheric oxygen, e.g. under an inert gas atmosphere ($N_2$) or under vacuum, in a kneader, mixer or stirred vessel. However, it is equally possible to carry out the process in an extruder and also in the presence of air.

The polycondensate to be heated and the blend of dianhydride, polyfunctional compound b) and phosphonic acid ester or half-ester are usually filled into the apparatus when heating starts, but it is also possible to subsequently add the blend to the polycondensate. The blend may be added as such or also as individual components in any sequence. For the addition, the components can be independently of one another in the form of a liquid, powder, granules or in compacted form, or also on a substrate, such as silica gel, or together with a polymer powder or wax, such as a polyethylene wax.

It is preferred to add 0.01 to 5 parts of phosphonate per 100 parts of polycondensate.

It is preferred to add 0.01 to 2.5 parts of the polyfunctional compound b) and 0.02 to 15 parts of the polyanhydride a) per 100 parts of polycondensate.

The ratio of n-functional compound b) to m-functional polyanhydride a) is from 2m/n to m/(4n).

The process is preferably carried out such that the maximum mass temperature of the melt is from 180° to 320° C.

Heating above the melting point or glass transition temperature is usually carried out, with stirring, until the blend is homogeneous. The temperature depends in this case on the polycondensate used. In the case of crystalline polyesters, processing is preferably carried out in the range from melting point to a temperature about 50° C. above the melting point. In the case of amorphous polyesters, the process is carried out approximately in the range from 50° C. to 150° C. above the respective glass transition temperature.

The processing apparatus is preferably a single-screw extruder, twin-screw extruder, planetary-gear extruder, ring extruder or Ko-kneader having at least one vent zone to which underpressure is applied.

A preferred process is that, which comprises applying an underpressure of less than 250 mbar, particularly preferably of less than 100 mbar and, very particularly preferably, of less than 50 mbar, to the vent zone.

Another preferred process is that, wherein the processing apparatus is a closely intermeshing twin-screw extruder or ring extruder with screws rotating in the same direction and with a feed section, a transition section, at least one vent zone and a metering zone, the vent zone being separated from the transition section or from another vent zone by a fusible plug.

This separation via a fusible plug can be effected, for example, by a combination of a kneading element and a return screw element.

The processing apparatus preferably has 1–4 vent zones, particularly preferably 1–3.

This invention also relates to the use of an additive blend, which comprises a) at least one polyfunctional anhydride (polyanhydride); b) at least one polyfunctional compound, the functional groups of which can react with the anhydride groups of the component a); and c) at least one phosphonate for increasing the molecular weight and for the modification of polycondensates during the processing in the melt.

The blend particularly preferably comprises 0.05%–0.5% of pentaerythritol, 0.1–3% of pyromellitic dianhydride and 0.03–1% of a compound of formula 11, III, IV, V or VI.

The blend very particularly preferably comprises 0.09%–0.2% of pentaerythritol, 0.18–1.2% of pyromellitic dianhydride and 0.05–0.5% of a compound of formula II, III, IV, V or VI.

This invention also relates to polycondensates which may be prepared by the process described above with addition of blowing agents, as well as to foamed products which may be prepared from the modified polycondensate, and to articles prepared by extrusion blow moulding of a modified polycondensate.

The process of this invention surprisingly results in polycondensates which are particularly suitable for extrusion blow moulding. No additional processing step or additional additives are necessary, it being sufficient that the novel additive blend is present in the polycondensate.

Further additives may be present in the polycondensate in addition to the novel additive blend. Examples thereof are listed below.

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methylundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl4-hydroxyphenyl stearate, bis-(3,5-di-tert-butyl4-hydroxyphenyl) adipate.

1.4. Tocopherols, for example a-tocopherol, β-tocopherol, δ-tocopherol, 8-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis-(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)4-methylphenol, 1,1,3-tris(5-tert-butyl-4-hydroxy-2-methylphenyl)butane, 1,1-bis(5-tert-butyl4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl) -6-tert-butyl4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl4-hydroxy-2-methylphenyl)pentane.

1.7. O-, N- and S-benzyl compounds, for example 3,5,3',5'-tetra-tert-butyl-4,4'-dihydroxydi-benzyl ether, octadecyl-4-hydroxy-3,5-dimethylbenzylmercaptoacetate, tridecyl4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl4-hydroxy-benzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, di-octadecyl-2-(3-tert-butyl-4-hydroxy-5-methylbenzyl)malonate, dido-decylmercaptoethyl-2,2-bis-(3,5-di-tert-butyl-4-hydroxybenzyl)malonate, bis[4-(1,1,3,3-tetramethylbutyl)phenyl]-2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl) -2,4,6-trimethylbenzene, 1,4-bis(3,5-di-tert-butyl-4-hydroxybenzyl)-2,3,5,6-tetramethylbenzene, 2,4,6-tris(3,5-di-tert-butyl4-hydroxybenzyl)phenol.

1.10. Triazine compounds, for example 2,4-bis (octylmercapto)-6-(3,5-di-tert-butyl-4-hydroxyanilino)-1,3,5-triazine, 2-octylmercapto4,6-bis(3,5-di-tert-butyl-4-hydroxyanilino)-1,3,5-triazine, 2-octylmercapto-4,6-bis (3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3,5-di-tert-butyl-4-hydroxyben-zyl) isocyanurate, 1,3,5-tris(4-tert-butyl-3-hydroxy-2,6-dimethylbenzyl)isocyanurate, 2,4,6-tris-(3,5-di-tert-butyl-4-hydroxyphenylethyl)-1,3,5-triazine, 1,3,5-tris(3,5-di-tert-butyl4-hydroxyphenylpropionyl) -hexahydro-1,3,5-triazine, 1,3,5-tris(3,5-dicyclohexyl-4-hydroxybenzyl)isocyanurate.

1.11. Acylaminophenols, for example 4-hydroxylauranilide, 4-hydroxystearanilide, octyl N-(3,5-di-tert-butyl-4-hydroxyphenyl)carbamate.

1.12. Esters of β-(3,5-di-tert-butyl4-hydroxyphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis(hydroxyethyl) oxamide, 3-thiaundecanol, 3-thiapentadecanol, trimethylhexanediol, trimethylol-propane, 4-hydroxymethyl-1-phospha-2,6,7-trioxabicyclo[2.2.2] octane.

1.13. Esters of β-(5-tert-butyl4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl) isocyanurate, N,N'-bis-(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.14. Esters of β-(3,5-dicyclohexyl-4-hydroxyphenyll) propionic acid with mono- or polyhydric alcohols, e.g. with methanol, ethanol, octanol, octadecanol, 1,6-hexanediol, 1,9-nonanediol, ethylene glycol, 1,2- propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.15. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2] octane.

1.16. Amides of β-(3,5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl4-hydroxyphenylpropionyl) trimethylenediamide, N,N'-bis(3,5-di-tert-butyl-4-hydroxyphenylpropionyl)-hydrazide, N,N'-bis[2-(3-[3,5-di-tert-butyl4-hydroxyphenyl]propionyloxy)ethyl] oxamide (Naugard®XL-1 supplied by Uniroyal).

1.17. Ascorbic acid (vitamin C)

1.18. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenlenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthyl-amine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis (phenylamino)-propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyidiphenylamines, a mixture of mono- and dialkylated dodecyidiphenylamines, a mixture of mono- and dialkylated isopropyl/isohexyldiphenylamines, a mixture of mono- und dialkylated tert-butyldiphenylamines, 2,3-dihydro-3,3-dimethyl-4H-1,4-benzothiazine, phenothiazine, a mixture of mono- und dialkylated tert-butyl/-tert-octylphenothiazines, a mixture of mono- und dialkylated tert-octyl-phenothiazines, N-allylphenothiazin, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. UV absorbers and light stabilisers 2.1.2-(2'-Hydroxyphenyl)benzotriazoles, for example 2-(2'-hydroxy-5'-methylphenyl)benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(a,a-dimethylbenzyl)-2'-hydroxyphenyl)benzotriazole, 2-(3'-tert-butyl-2'-hydroxy-5'-(2-octyloxycarbonylethyl) phenyl)-5-chlorobenzotriazole, 2-(3'-tert-butyl-5'-[2-(2-ethylhexoxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonyl-ethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2-hydroxyphenyl]-2H-benzotriazole with polyethylene glycol 300; [R—CH₂CH₂—COO—CH₂CH₂—]₂ where R=3'-tert-butyl-4'-hydroxy-5'-2H-benzotriazol-2-ylphenyl, 2-[2'-hydroxy-3'-(α,α-dimethylbenzyl)-5'-(1,1 3,3-tetramethylbutyl)phenyl]-benzotriazole; 2-[2'-hydroxy-3'-(1,1,3,3-tetramethylbutyl)-5'-(α,α-dimethylbenzyl) phenyl]benzotriazole.

2.2.2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy4,4'-dimethoxy derivatives.

2.3. Esters of substituted and unsubstituted benzoic acids, as for example 4-tertbutyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl a-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)s ebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl4-hydroxypiperidine and succinic acid, linear or cyclic condensates of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetrame-thylpiperazinone), 4-benzoyl-2,2,6,6-tetramethylpiperidine, 4-stearyloxy-2,2,6,6-tetramethyl-piperidine, bis(1,2,2,6,6-pentamethylpiperidyl)-2-n-butyl-2-(2-hydroxy-3,5-di-tert-butylbenzyl)-malonate, 3-n-octyl-7,7,9,9-tetramethyl-1,3,8-triazaspiro[4.5]decane-2,4-dione, bis (1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl )-1,3,5-triazine and 1,2-bis(3-aminopropylamino)-ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4,5]decane-2,4-dione, 3-dodecyl-1-(2,2,6,6-tetramethyl4-piperidyl)pyrrolidin-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl) hexamethylenediamine and 4-cyclohexylamino -2,6-dichloro-1,3,5-triazine, a condensation product of 1,2-bis (3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimid, N-(1,2,2,6,6-pentamethyl-4-piperidyl)-n-dodecylsuccinimid, 2-undecyl-7,7,9,9-tetramethyl-1-oxa-3,8-diaza4-oxo-spiro[4,5]decane, a reaction product of 7,7,9,9-tetramethyl-2-cycloundecyl-1-oxa-3,8-diaza-4-oxospiro [4,5]decane und epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxy-methylenemalonic acid with 1,2,2,6,6-pentamethyl4-hydroxypiperidine, poly[methylpropyl-3-oxy4-(2,2,6,6-tetramethyl 4-piperidyl)]siloxane, reaction product of maleic acid anhydride-α-olefin-copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8.2-(2-Hydroxyphenyl)-1,3,5-triazines, for example 2,4,6-tris(2-hydroxy-4-octyloxyphenyl) -1,3,5,2-(2-hydroxy4-octyloxyphenyl)4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy4-propyloxyphenyl)-6-(2,4-dimethylphenyl)-1,3,5-triazine, 2-(2-hydroxy-4-octyloxyphenyl)4,6-bis(4-methylphenyl)-1,3,5-triazine, 2-(2-hydroxy-4-dodecyloxyphenyl)4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]4,6-bis(2,4-dimethylphenyl)-1,3,5-triazine, 2-[2-hydroxy-4-(2-hydroxy-3-dodecyloxypropoxy)phenyl]4,6-bis(2,4-dimethylphenyl)-1,3,5-triazine, 2-(2-hydroxy-4-hexyloxy)phenyl-4,6-diphenyl-1,3,5-triazine, 2-(2-hydroxy-4-methoxyphenyl)4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl) hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis (salicyloyl)thiopropionyl dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis(2,6-di-tert-butyl4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-1 2H-dibenz-[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2"-nitrilo[triethyltris(3,3', 5,5'-tetra-tert-butyl-1,1'-biphenyl -2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

Especially preferred are the following phosphites:
Tris(2,4-di-tert-butylphenyl) phosphite (Irgafos® 168, Ciba-Geigy), tris(nonylphenyl) phosphite,

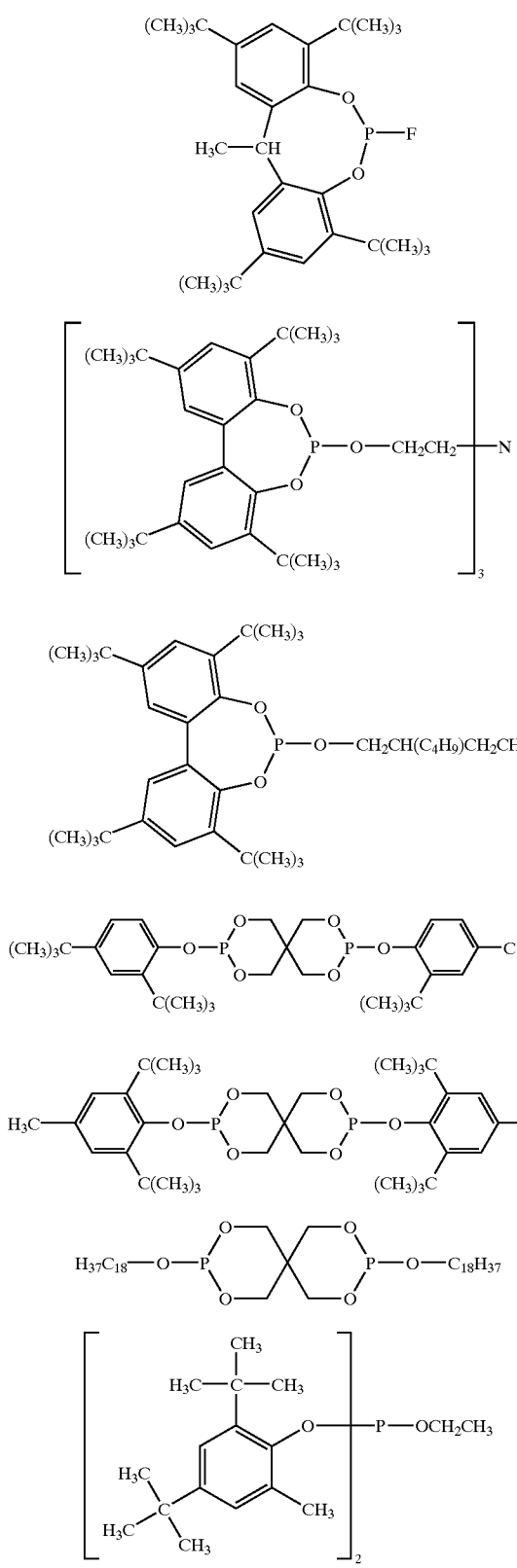

5. Hydroxylamines, for example, N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Nitrones, for example, N-benzyl-alpha-phenylnitrone, N-ethyl-alpha-methyinitrone, N-octyl-alpha-heptylnitrone, N-lauryl-alpha-undecylnitrone, N-tetradecyl-alpha-tridcylnitrone, N-hexa-decyl-alpha-pentadecylnitrone, N-octadecyl-alpha-heptadecylnitrone, N-hexadecyl-alpha-heptadecyInitrone, N-ocatadecyl-alpha-pentadecylnitrone, N-heptadecyl-alpha-heptadecyl-nitrone, N-octadecyl-alpha-hexadecylnitrone, nitrone derived from N,N-dialkylhydroxylamine derived from hydrogenated tallow amine.

7. Thiosynergists, for example dilauryl thiodipropionate or distearyl thiodipropionate.

8. Peroxide scavengers, for example esters of P-thiodipropionic acid, for example the lauryl, stearyl, myristyl or tridecyl esters, mercaptobenzimidazole or the zinc salt of 2-mercaptobenzimidazole, zinc dibutyidithiocarbamate, dioctadecyl disulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zink pyrocatecholate.

11. Nucleating agents, for example, inorganic substances such as talcum, metal oxides such as titanium dioxide or magnesium oxide, phosphates, carbonates or sulfates of, preferably, alkaline earth metals; organic compounds such as mono- or polycarboxylic acids and the salts thereof, e.g. 4-tert-butylbenzoic acid, adipic acid, diphenylacetic acid, sodium succinate or sodium benzoate; polymeric compounds such as ionic copolymers (ionomers).

12. Fillers and reinforcing agents, for example calcium carbonate, silicates, glass fibres, glass bulbs, asbestos, talc, kaolin, mica, barium sulfate, metal oxides and hydroxides, carbon black, graphite, wood flour and flours or fibers of other natural products, synthetic fibers.

13. Other additives, for example, plasticisers, lubricants, emulsifiers, pigments, rheology additives, catalysts, flow control agents, optical brighteners, flameproofing agents, antistatic agents and blowing agents.

14. Benzofuranones and indolinones, for example those disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl) -5,7-di-tert-butyl-benzofuran-2-one.

15. Carbodiimides Poly[nitrilomethanetetraylnitrilo[2,4,6-tris(1-methylethyl)-1,3-phenylene]], poly[nitrilomethanetetraylnitrilo(2,4,6-triisopropyl-m-phenylene)], polymers with methanediimines and 1,1'-methylenebis[4-isocyanatobenzene], poly(1,3,5-triisopropylbenzene-2,4-carbodiimide), 1,3-diphenylcarbodiimides, bis(3-methylphenyl)carbodiimides, carbodiimides, di-2-pyridyl, bis(cyclohexyl)carbodiimides, dibutylcarbodiimides, N,N'-diisobutylcarbodiimides.

In a preferred embodiment of this invlention, a carbodiimide is additionally added.

The following Examples illustrate the invention.

Processing:

The blends listed in Table 1 are prepared, processed and analysed:

TABLE 1

Comparison Examples and Example 1 (parts by weight)

|  | Comparison Example 1 | Comparison Example 2 | Comparison Example 3 | Example 1 of this invention |
|---|---|---|---|---|
| Polyclear RT43 (Hoechst Trevira) | 100 | 100 | 100 | 100 |
| pentaerythritol | 0 | 0.1 | 0.1 | 0.1 |
| PMDA | 0 | 0 | 0.5 | 0.5 |
| phosphonate 1 | 0 | 0.25 | 0 | 0.25 |

Phosphonate 1: The calcium salt of monoethyl 3,5-di-tert-butyl-4-hydroxybenzylphosphonate

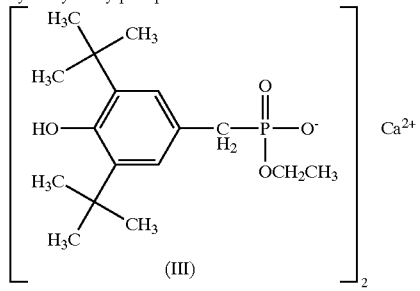

The starting material is predried for at least 8 h at 80° C. under vacuum. About 1 kg each of the blend are prepared by physical blending in a rotary mixer. The blends are extruded in a closely intermeshing Haake TW100 twin-screw extruder with conical screws rotating in the same direction and are pelletised to strands through a pelletising die in a waterbath.

T-programme: 210° C. (feed) to 260° C. (die)

vacuum: 3 mbar in the vent zone screw speed: 60 rpm throughput: 30 g/min water

Measurements

Intrinsic viscosity (I.V.): 1 g of polymer are dissolved in 100 g of a 1:1 mixture of o-dichloro-benzene and phenol. The viscosity of the solution is measured at 30° C. in an Ubbelode viscosimeter and conylerted to the intrinsic viscosity (in analogy to DIN 53728).

Melt flow rate (MFR): Measurements are carried out at 260° C. with 1.2 kg of polymer by means of a melt index test apparatus Gottfert MP-D (ISO 1133)

$\alpha$=MFR·I.V.: Key figure for the shear liquefaction.

The results are compiled in Table 2

TABLE 2

| Example | I. V. [dl/g] | MFR [g/10 min] | $\alpha$ = MFR · I. V. [dl/10 min] |
|---|---|---|---|
| comparison Example 1 | 0.61 | 25 | 15 |
| comparison Example 2 | 0.59 | 31 | 18 |
| comparison Example 3 | 0.57 | 17 | 10 |
| Example 1 | 0.65 | 9 | 6 |
| Polyclear RT43 | 0.63 | 20 | 13 |

In contrast to the comparison Examples, the molecular weight-increasing effect of the novel blend shows in a higher I.V. value at simultaneously lower MFR value.

What is claimed is:

1. A process for increasing the molecular weight and/or for the modification of an aliphatic or aromatic polyester or a copolymer thereof in the melt, which comprises adding to the polyester a blend consisting essentially of
   a) a tetracarboxylic acid dianhydride;
   b) a polyol; and
   c) at least one phosphonate of formulae II, III, IV, V or VI

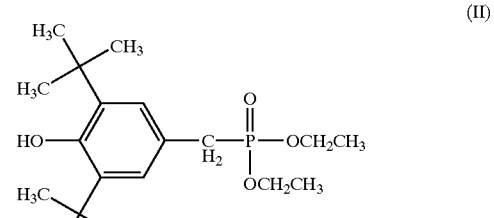

(II)

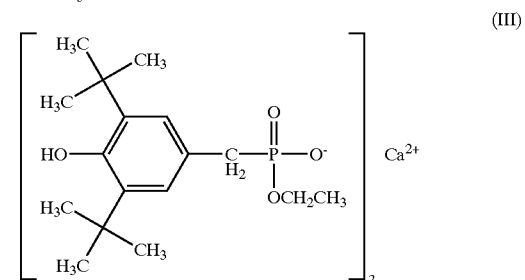

(III)

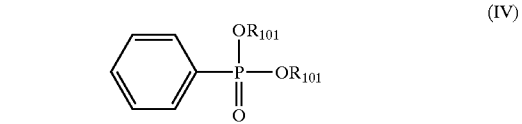

(IV)

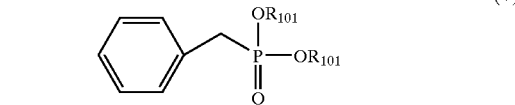

(V)

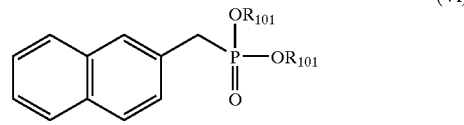

(VI)

wherein the $R_{101}$ are each independently of one another hydrogen or $M^{r+}/r$, wherein $M^{r+}$ is a r-valent metal cation.

2. A process according to claim 1, wherein the polyester is polyethylene terephthalate (PET), polybutylene terephthalate (PBT), polyethylenenaphthenate (PEN).

3. A process according to claim 1, wherein the polyester is a recyclate.

4. A process according to claim 1, wherein the polyester is PET or a copolymer with PET.

5. A process according to claim 1, which comprises using pyromellitic dianhydride, benzophenonetetracarboxylic dianhydride, 1,1,2,2-ethanetetracarboxylic dianhydride, 1,2,3,4-cyclopentanetetracarboxylic dianhydride, diphenylsulfonetetracarboxylic dianhydride, 5-(2,5-dioxotetrahydro-3-furanyl)-3-methyl-3 cyclohexane-1,2-dicarboxylic dianhydride, bis(3,4-dicarboxylic acid phenyl)ether dianhydride, bis(3,4-dicarboxylic acid phenyl)thioether dianhydride, bisphenol A bisether dianhydride, 2,2-bis(3,4-dicarboxylic acid phenyl)hexafluoropropane dianhydride, 2,3,6,7-naphthalenetetracarboxylic dianhydride, bis(3,4-dicarboxylic acid phenyl)sulfone dianhydride, 1,2,5,6-naphthalenetetracarboxylic dianhydride, 2,2',3,3'-biphenyltetracarboxylic dianhydride, hydroquinone bisether dianhydride, 3,4,9,10-perylenetetracarboxylic dianhydride, 1,2,3,4-cyclobutanetetracarboxylic dianhydride, 3,4-dicarboxy-1,2,3,4-tetrahydro-1-naphthalenesuccinic dianhydride, bicyclo(2,2)oct-7-ene-2,3,5,6-tetracarboxylic dianhydride, tetrahydrofuran-2,3,4,5-tetracarboxylic dianhydride, 2,2-bis(3,4-dicarboxyphenyl)propane dianhydride, 3,3',4,4'-biphenyltetracarboxylic dianhydride, 4,4'-oxydiphthalic dianhydride (ODPA), ethylenediaminetetracarboxylic dianhydride (DDTAH), or a combination of these dianhydrides.

6. A process according to claim 1, wherein the polyol is glycerol or pentaerythritol.

7. A process according to claim 1, which comprises using 0.01 to 5 parts of phosphonate per 100 parts of polyester.

8. A process according to claim 1, which comprises using 0.01 to 2.5 parts of the polyol compound b) and 0.02 to 15 parts of the tetracarboxylic acid dianhydride a) per 100 parts of polyester.

9. A process according to claim 1, wherein the ratio of n-functional compound b) to 2-functional anhydride a) is from 4/n to 2/(4n).

10. A process according to claim 1, wherein the maximum mass temperature of the melt is from 180° to 320° C.

11. A process according to claim 1, which comprises additionally using a carbodiimide.

12. A polycondensate which can be prepared by a process according to claim 1.

13. A foamed polycondensate which can be prepared according to claim 1 by additionally adding a blowing agent.

14. An article prepared by extrusion blow moulding a polycondensate according to claim 12.

* * * * *